United States Patent [19]

Shanley, II

[11] 4,451,840

[45] May 29, 1984

[54] PICTURE CONTROL FOR TELEVISION RECEIVER ON-SCREEN DISPLAY

[75] Inventor: Robert L. Shanley, II, Indianapolis, Ind.

[73] Assignee: RCA Corporation, New York, N.Y.

[21] Appl. No.: 325,049

[22] Filed: Nov. 25, 1981

[51] Int. Cl.³ .................................... H04N 5/22
[52] U.S. Cl. ................................ 358/22; 358/169; 358/183
[58] Field of Search ............... 358/12, 22, 74, 165, 358/166, 169, 182, 183, 243; 340/701, 703, 704, 723

[56] References Cited

U.S. PATENT DOCUMENTS

| | | |
|---|---|---|
| 3,983,576 | 9/1976 | Shanley, II et al. ............ 358/166 |
| 3,984,828 | 10/1976 | Beyers, Jr. ...................... 358/166 |
| 4,218,698 | 8/1980 | Bart et al. ........................ 358/22 |
| 4,360,804 | 11/1982 | Ohura .............................. 358/22 |

FOREIGN PATENT DOCUMENTS 1541166 2/1979 United Kingdom .

OTHER PUBLICATIONS

Motorola TDA 3300 Video Processor Integrated Circuit: Diagram Showing External IC Connections (FIG. 6), and Two Sheets of the Schematic Circuit Diagram of the Integrated Circuit.

*Primary Examiner*—Tommy P. Chin
*Attorney, Agent, or Firm*—Eugene M. Whitacre; Paul J. Rasmussen; Ronald H. Kurdyla

[57] ABSTRACT

Apparatus for simultaneously controlling the contrast of broadcast color video signal information and auxiliary color graphics information displayed by the kinescope of a color television receiver. Plural kinescope color signal coupling paths receive color video signals, a white drive graphics signal which is applied in common to the plural signal paths with a sense for enabling the kinescope to display color graphics information during graphics intervals, and plural blanking signals which are separately applied to the color signal paths for selectively blanking the outputs of the signal paths to determine the color of displayed graphics information. A picture control signal simultaneously varies the level of the color video signal and the level of the common white drive graphics signal in the same sense.

5 Claims, 5 Drawing Figures

| TIME | TRANSISTOR CONDUCTION STATES FOR ON-SCREEN DISPLAY | | | | |
|---|---|---|---|---|---|
| | 52,54 | 40 | 41 | 56 | 57 |
| $T_0$ | OFF | ON | ON | ON | OFF |
| $T_1$ | OFF | OFF | OFF | OFF | ON |
| $T_2$ | ON | OFF | ON | ON | OFF |
| $T_3$ | OFF | OFF | OFF | OFF | ON |
| $T_4$ | OFF | ON | ON | ON | OFF |

PICTURE CONTROL FOR TELEVISION RECEIVER ON-SCREEN DISPLAY

This invention concerns an arrangement for controlling the contrast of pictures reproduced by a color television receiver or equivalent system in response to auxiliary graphics information signals.

Many color television receivers include provision for electronic on-screen kinescope display of graphics characters representative of the number of the channel to which the receiver is tuned, for example. Such displays are typically generated by replacing normal video information with appropriately horizontally and vertically synchronized graphics representative signals developed by a suitable graphics character generator in the receiver, so that the graphics information is displayed on a given portion of the kinescope screen. One system of this type is described in U.S. Pat. No. 3,984,828—Beyers. Information displayed by such systems can include alphanumeric and graphics information alone (e.g., "video games" and data displays), or mixed video and graphics information (e.g., superimposed channel number, time, subtitles, weather, sports or road traffic information), by employing appropriate electronic control circuits in the receiver. Graphics information signals are also commonly associated with a Teletext system, which involves transmitting graphics information through conventional television transmitting equipment, and receiving, decoding and displaying the graphics information by means of a television receiver in a known manner.

Television receivers and similar video signal processing systems commonly include provision for manually controlling the contrast of displayed video information by controlling the peak-to-peak amplitude of the video signals processed by the system (e.g., by means of a viewer adjustable potentiometer). Some television receivers also include provision for automatically controlling the contrast of a displayed picture.

It is desirable for a television receiver which also includes provision for on-screen display of auxiliary graphics information to control the contrast of the displayed auxiliary graphics information simultaneously with and in the same sense as the contrast of normally displayed pictures developed in response to broadcast video signals. Such simultaneous contrast control (i.e., contrast tracking) assures that the displayed graphics information (e.g., channel number or time of day) will exhibit a proper intensity level relative to the surrounding video signal picture display. In the absence of such contrast tracking, the displayed graphics information may appear disturbingly intense or faded relative to the surrounding video signal picture display.

It is herein recognized as desirable to reliably establish the color of displayed graphics information, and to provide graphics and video picture contrast tracking in a manner which significantly reduces the likelihood of shifts in the color of displayed graphics information as picture contrast is varied. These objectives are obtained by apparatus according to the present invention.

In accordance with the principles of the present invention, there is disclosed herein apparatus for simultaneously controlling the contrast (i.e., picture level) of color pictures reproduced in response to both normal broadcast video signals and auxiliary graphics signals. The apparatus is included in a video signal processing system wherein color video signals are applied to a color kinescope via plural color signal coupling paths. A graphics color drive signal and plural graphics blanking signals are also applied to the signal coupling paths. The graphics color drive signal is applied in common to the plural signal paths with a sense for enabling the kinescope to display color graphics information during graphics intervals. The plural graphics blanking signals are separately applied to the signal paths for selectively blanking the outputs of the signal paths to determine the color of displayed graphics information. A picture control signal simultaneously varies the level of the color video signal and the level of the common graphics color drive signal in the same sense, so that the contrast of displayed color video information tracks with the contrast of displayed color graphics information.

Figure 1:
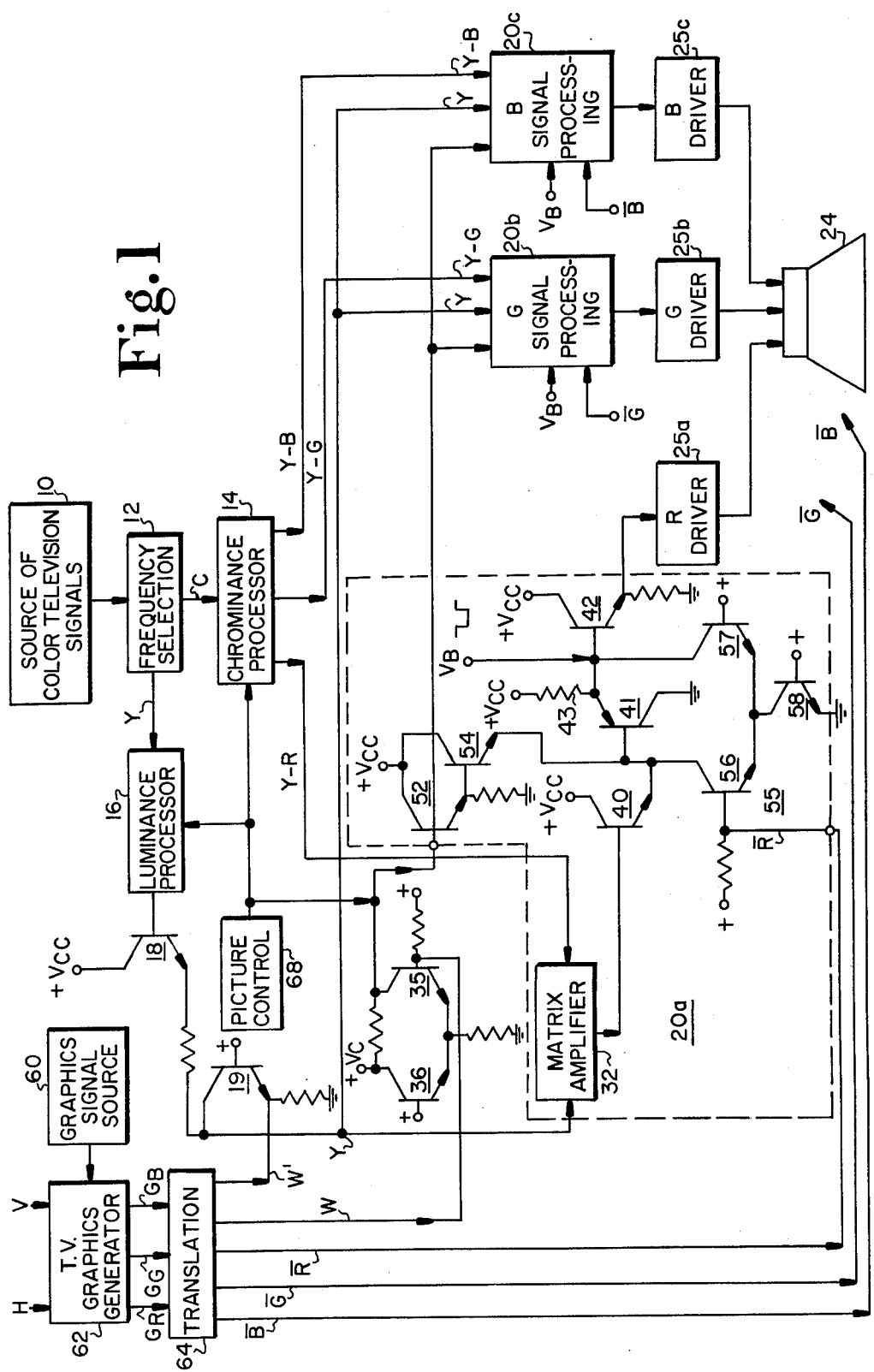
FIG. 1 illustrates a portion of a color television receiver, partly in block diagram form and partly in schematic circuit diagram form, including a video and graphics picture control arrangement according to the present invention.

In FIG. 1, color television signals from a source 10 are processed by a frequency selection network 12 (e.g., including a comb filter) to produce separated luminance (Y) and chrominance (C) components of the television signal. A chrominance processor 14 responds to the separated chrominance component for developing Y-R, Y-G and Y-B color difference signals, which are respectively coupled to red, green and blue signal processing networks 20a, 20b and 20c. The separated luminance signal is coupled via a luminance processor 16 and an emitter follower transistor 18 to each of networks 20a, 20b and 20c, where the luminance signal is combined with the respective color difference signals to produce output red, green and blue color image representative signals. These color signals are applied to a color kinescope 24 via respective red, green and blue video output driver stages 25a, 25b and 25c for reproducing an image on the screen of the kinescope.

Color signal processing networks 20a, 20b and 20c are similar in structure and operation. Therefore the following description of red color signal processing network 20a also applies to networks 20b and 20c.

Network 20a includes an input matrix amplifier 32 which receives the luminance signal and the Y-R red color difference signal. A red color output signal from amplifier 32 is supplied to red signal driver 25a by means of a coupling network comprising a plurality of cascade connected emitter follower transistors 40, 41 and 42.

Network 20a also includes emitter follower transistors 52 and 54 connected in a Darlington configuration, and a switched current steering network 55 comprising differentially connected transistors 56, 57 and an associated current source transistor 58 which supplies an operating current for current steering transistors 56 and 57. Transistors 52, 54 and network 55 enable the receiver to operate in an "on-screen" display mode for the purpose of displaying auxiliary graphics information during prescribed intervals, as will now be discussed.

Signals representative of graphics information to be displayed are provided by means of a graphics signal source 60. For example, when the graphics information to be displayed corresponds to the number of the broadcast channel to which the receiver is tuned, source 60 responds to signals derived from the channel tuning system of the receiver to develop a binary coded signal representative of the channel number to which the receiver is tuned. This signal is applied to a suitable graphics signal generator 62 (e.g., a microprocessor). Graphics generator 62 is synchronized by horizontal (H) and vertical (V) scanning rate signals to cause the graphics data to be displayed in a particular segment of the viewing screen of the kinescope. Other information such as the time of day and Teletext information can also be applied to generator 62 for suitable conversion to video signal display format. Signals from source 60 contain intelligence for determining when graphics information is to be displayed instead of normal broadcast video information, and the color of the displayed graphics information, for example.

Figure 2:
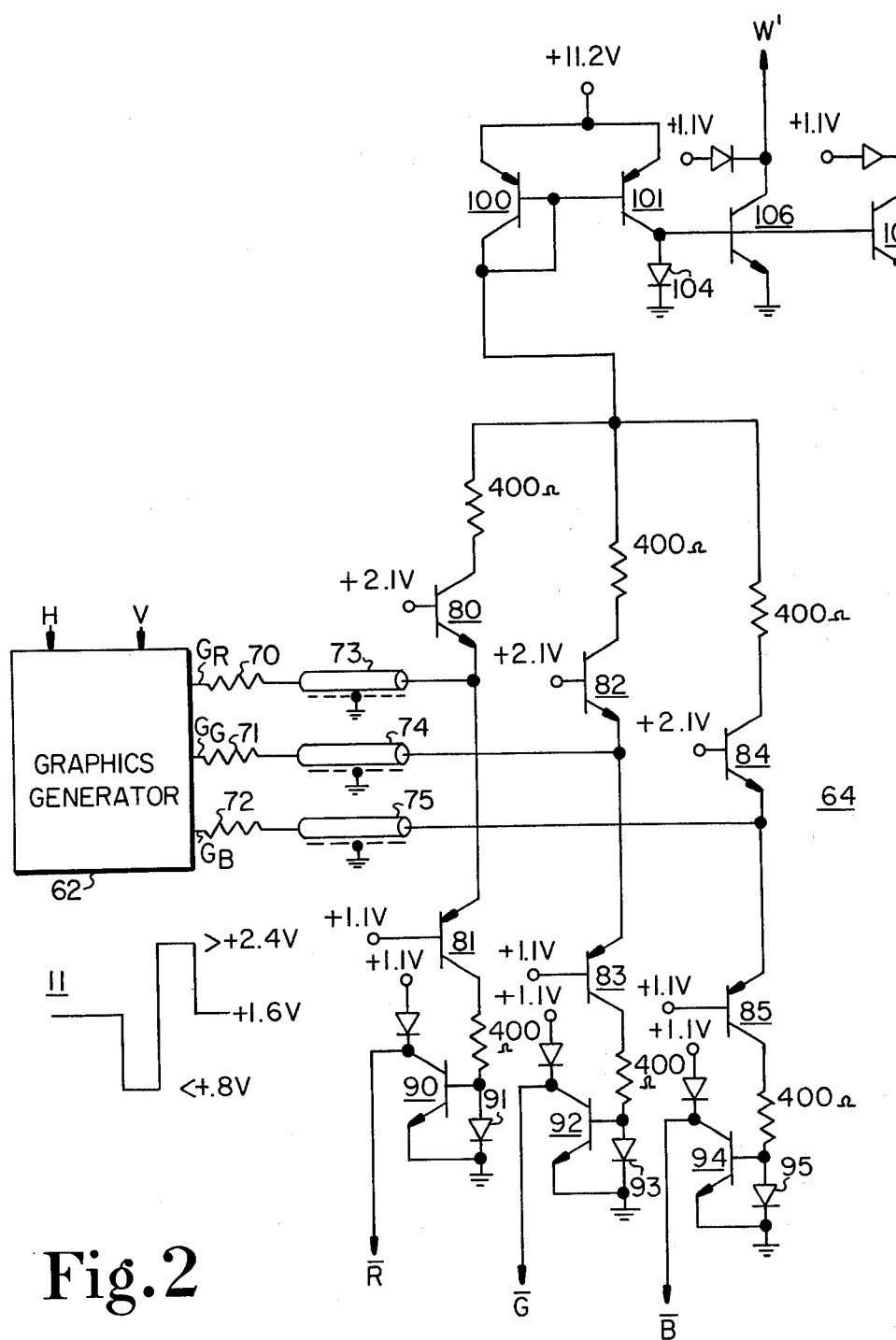
FIG. 2 illustrates circuit details of a graphics signal translating network employed in the system of FIG. 1.

Graphics character generator 62 provides plural, suitably timed output signals $G_R$, $G_G$ and $G_B$ respectively corresponding to red, green and blue graphics signal information. These signals are supplied to a graphics signal translating network 64 which provides output "black drive" graphics switching signals $\overline{R}$, $\overline{G}$, $\overline{B}$ and output "white drive" graphics switching signals W and W'. FIG. 2 shows circuit details of translator 64.

In FIG. 2, graphics generator 62 provides tristate logic outputs with respect to each of the $G_R$, $G_G$ and $G_B$ graphics signals. As indicated by waveform 11, the tristate logic output signal manifests a first logic level of +1.6 volts when no graphics information is to be displayed (i.e., when the kinescope responds normally to display broadcast video signals), a second logic level of less than +0.8 volts when graphics information is to be displayed with a color other than black, and a third logic level of greater than +2.4 volts when black graphics information is to be displayed. The outputs of graphics generator 62 are respectively coupled to inputs of circuit 64 via current determining resistors 70, 71, 72 and conductors (e.g., shielded cables) 73, 74. 75.

Circuit 64 comprises complementary conductivity type emitter coupled, emitter input transistor pairs 80 and 81, 82 and 83, and 84 and 85 which respectively respond to graphics signals $G_R$, $G_G$ and $G_B$. Collector currents conducted by transistors 81, 83 and 85 are respectively replicated by means of current mirror circuits including transistor 90 and diode 91, transistor 92 and diode 93, and transistor 94 and diode 95. Graphics switching control signals $\overline{R}$, $\overline{G}$ and $\overline{B}$ are derived from the collector outputs of transistors 90, 92 and 94. The levels of signals $\overline{R}$, $\overline{G}$ and $\overline{B}$ are a function of the conductive state of associated current mirror transistors 90, 92 and 94 in response to the level of graphics signals $G_R$, $G_G$ and $G_B$. Collector currents conducted by transistors 80, 82 and 84 are combined and replicated by means of current mirror circuits including diode connected transistor 100 and transistor 101, diode 104 and transistor 106, and diode 104 and transistor 108. Graphics switching control signals W and W' are similar in timing and magnitude and are derived from the collector outputs of transistors 108 and 106, respectively. The levels of signals W and W' are a function of the conductive state of current mirror transistors 108 and 106 in response to the graphics signals from generator 62. Translating circuit 64 is discussed in greater detail in a copending U.S. patent application Ser. No. 323,351 of R. L. Shanley, II, et al. filed Nov. 20, 1981, titled "Translating Circuit for Television Receiver On-Screen Graphics Display Signals."

Continuing with FIG. 1, signal W from network 64 is applied to the base input of a transistor 35 which is arranged in a differential configuration with a transistor 36. A control signal developed at the collector output of transistor 35 in response to the level of signal W is applied to Darlington connected emitter follower transistors 52 and 54 at a first graphics control input of red signal processing circuit 20a. The control signal from transistor 35 is also applied to corresponding graphics control inputs of green and blue signal processing networks 20b and 20c. Signal W' from network 64 is coupled to the emitter of a current source transistor 19 associated with luminance signal coupling transistor 18. Signal $\overline{R}$ from network 64 is applied to the base electrode of differentially connected transistor 56 of red signal processing network 20a, corresponding to a second graphics control input of network 20a. Signals $\overline{G}$ and $\overline{B}$ are respectively applied to corresponding second graphics control inputs of green and blue signal processing networks 20b and 2c.

Figures 3, 4:
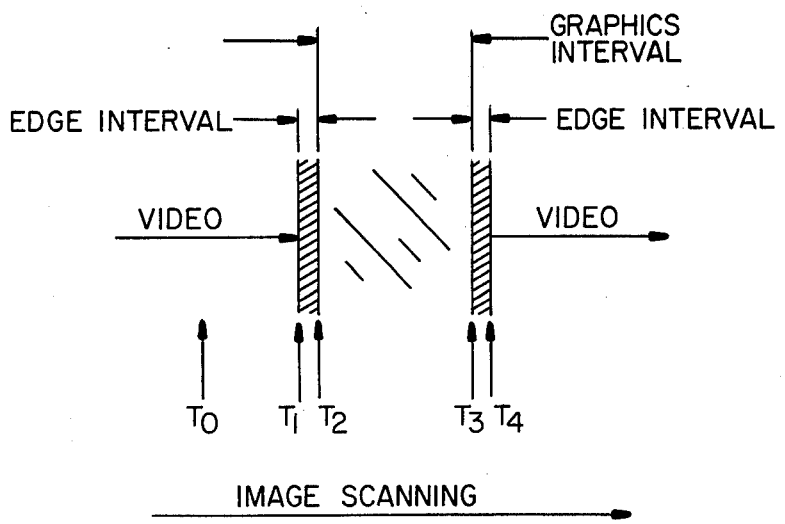
FIG. 3 illustrates a portion of a displayed graphic symbol generated by the system of FIG. 1.
FIG. 4 illustrates a table depicting the operating states of circuit elements associated with the graphics signal display system.

The operation of the system of FIG. 1 in a normal video display mode and in graphics display mode will now be discussed in conjunction with FIGS. 1, 3 and 4. For purposes of the following discussion it will be assumed that the graphics information to be displayed comprises a red graphics character occurring during a graphics interval, preceded and followed by a narrow black border occurring at the edges of the graphics symbol. Accordingly, FIG. 3 depicts a portion of one horizontal image scanning line. Normal video information is displayed during time $T_0$ prior to time $T_1$, and after time $T_4$. The on-screen display interval comprises a leading black edge interval from time $T_1$ to $T_2$, a graphics symbol display interval between times $T_2$ and $T_3$, and a following black edge interval from time $T_3$ to $T_4$.

The table in FIG. 4 shows the conductive ("ON") and non-conductive ("OFF") states of transistors 52, 54, 40, 41, 56 and 57 in processor 20a of FIG. 1 for producing the display shown in FIG. 3. Thus during the normal video signal intervals during time $T_0$ and after time $T_4$, emitter follower transistors 40 and 41 couple video signals from transistor 32 to transistor 42, which in turn couples the video signals to driver 25a. At this time signal W' maintains current source transistor 19 in a normal conductive state for permitting transistor 18 to conduct luminance signals normally, while signal W biases transistor 35 so that transistors 52 and 54 are rendered non-conductive. Signal $\overline{R}$ biases differentially connected current steering transistor 56 to conduct, whereby the current from current source transistor 58 is conducted by signal coupling follower transistor 40 via transistor 56. Thus during the normal video signal image intervals transistor 58 represents the current source for follower transistor 40. During this time signal processing networks 20b and 20c exhibit the same operating condition as network 20a.

At the beginning of the on-screen display interval commencing at time $T_1$, differential switching transistor 56 is rendered non-conductive in response to signal $\overline{R}$, whereby transistor 57 conducts and the current from current source transistor 58 now flows through transistor 57. Specifically, current from transistor 58 flows in a path including emitter resistor 43 of transistor 41 and transistor 57. This conductive state of switching transistor 57 renders emitter follower transistors 40 and 41 non-conductive, and provides the mechanism whereby current source transistor 58 sources the current for producing a black display (i.e., the output of network 20a is blanked). Transistors 52 and 54 remain nonconductive in response to signal W. Accordingly, normal video signals are inhibited in the output of network 20a, and the kinescope produces a black display. At this time the output of network 20a exhibits a "blacker-than-black" blanking level to assure that the red electron gun of kinescope 24 is cut off. In this case the black display occurs during the edge interval between times $T_1$ and $T_2$, during which time signal processing networks 20b and 20c exhibit the same operating condition as network 20a.

At the beginning of the (red) graphics display interval commencing at time $T_2$, differentially connected current steering transistors 56 and 57 change conductive state in response to signal $\overline{R}$ such that transistor 56 is rendered conductive and transistor 57 is rendered non-conductive. Therefore, the current from source transistor 58 is conducted by transistor 56. At this time graphics drive transistors 52 and 54 are rendered conductive in response to signal W, and the emitter current of transistor 54 is supplied by current source transistor 58 via switching transistor 56. The emitter of transistor 40 is reverse biased in response to the bias supplied from the emitter of conductive transistor 54, and emitter follower coupling transistor 41 returns to a conductive state in response to switching transistor 57 being non-conductive. Transistors 41 and 42 therefore conduct a red graphics enabling signal to red driver 25a between times $T_2$ and $T_3$ for producing a red graphics display in response to the output of conductive graphics drive transistors 52, 54.

During the graphics interval the operating current for graphics signal drive transistor 54 is supplied by current source transistor 58 via transistor 56.

The outputs of green and blue signal processing networks 20b and 20c are blanked during the red graphics display interval in response to signals $\overline{G}$ and $\overline{B}$. These signals cause the switching transistors in networks 20b and 20c which correspond to switching transistors 56 and 57 of network 20a to exhibit the conductive states required for rendering the follower transistor corresponding transistor 41 non-conductive, in the manner discussed previously (i.e., corresponding transistors 56 and 57 in networks 20b and 20c are rendered non-conductive and conductive, respectively).

During the following black edge interval between times $T_3$ and $T_4$, the operating condition of networks 20a, 20b and 20c is the same as during leading black edge interval $T_1$-$T_2$ discussed previously. Similarly, the operating condition of these networks during the normal video interval after time $T_4$ is the same as during the video interval including time $T_0$, as also discussed previously.

Colors other than red can be displayed during the graphics interval. For example, white can be displayed when signal processing circuits 20a, 20b and 20c all exhibit the operating condition shown in the table of FIG. 4 for the interval between times $T_2$ and $T_3$. In such case the outputs of all of these networks will be enabled, or unblanked, during the graphics interval. A yellow color graphics can be displayed when red signal processing network 20a and green signal processing network 20b both exhibit the operating condition shown in FIG. 4 for the interval from time $T_2$ to $T_3$, and when blue signal processing network 20c exhibits the condition shown in FIG. 4 for the interval from time $T_1$ to $T_2$ except that corresponding transistors 52 and 54 in network 20c are "ON" or conductive. In this case the outputs of red and green networks 20a and 20b will be enabled or unblanked, and the output of the blue network 20c will be blanked, whereby a yellow kinescope display will be produced.

During the graphics interval from time $T_2$ to $T_3$, current source transistor 19 increases conduction in response to signal W' for shifting the DC level of the luminance signal derived from the collector of transistor 19 in a direction to insure that follower transistor 40 remains off.

The described system is capable of producing several colors during the on-screen display intervals, including black and white, the primary colors red, green and blue, and complementary colors yellow, cyan and magenta, by blanking and unblanking the outputs of appropriate combinations of red, green and blue signal processing networks 20a, 20b and 20c. In this regard it is noted that transistors 52, 54 of network 20a and the corresponding transistors in networks 20b and 20c are rendered conductive simultaneously in response to signal W whenever a graphics color other than black is to be produced during the on-screen display intervals. The desired graphics color is produced by blanking one or a selected combination of two of the outputs of signal processing networks 20a, 20b and 20c by means of an appropriate combination of signals $\overline{R}$, $\overline{G}$, $\overline{B}$. A white graphics display is produced when the outputs of networks 20a, 20b and 20c are all unblanked.

The system of FIG. 1 also includes a picture control network 68 (e.g., including a viewer adjustable potentiometer) for simultaneously controlling the magnitudes of the luminance and chrominance components of the video signal, and the magntiude of the graphics display drive signal developed at the base of transistor 52 in response to signal W. Specifically, a variable output control voltage from network 68 varies the peak-to-peak amplitude of the luminance signal processed by unit 16, to thereby control the contrast of a displayed picture. The control voltage simultaneously controls the peak-to-peak amplitude of the chrominance component processed by unit 14 with a sense for maintaining a desired relationship between the amplitudes of the chrominance and luminance signals as the picture control voltage is varied. At the same time, the picture control voltage varies the magnitude of the graphics drive signal which is applied to the base of transistor 52, to maintain a desired (i.e., tracking) relationship between the level of the graphics drive signal and the levels of the luminance and chrominance signals. Accordingly, the contrast of displayed video information produced in response to control of the luminance and chrominance signals tracks with and varies in the same sense as the contrast of displayed graphics information produced in response to signal W.

It is noted that the picture control voltage from network 68 is applied in common to red, green and blue color signal processing networks 20a, 20b and 20c via the common graphics drive signal. This arrangement advantageously significantly reduces the likelihood of unwanted graphics drive offsets being introduced with respect to the graphics drive signals applied to the three color signal processing networks. As a result, the mutual balance of the graphics drive signal levels required to produce a white graphics display is reliably and predictably maintained, and the likelihood of unwanted graphics color variations with variations of the picture control voltage is significantly reduced. In the latter regard, an unwanted offset among the levels of the graphics drive signals applied to the color signal processing networks can result in a varying graphics color shift as the picture control is varied, since the levels of the kinescope drive signals required to produce a desired color display will vary from required mutually proportioned levels as the picture control is varied.

If the color graphics drive signal is constituted by three separate drive signals (rather than one, common white drive signal as in the present arrangement), the magnitude of the unwanted offsets would be a function of amplitude mismatches among the three separate drive signals. The magnitude of such offsets would also be a function of the complexity of the circuits which respectively couple the three separate drive signals to the three color signal processing networks. In the latter case, the coupling circuits would have to be carefully designed to minimize the effects of temperature variations, mismatching of component values, and operating parameter variations among the three graphics drive signal coupling networks.

In the disclosed system, graphics blanking control signals $\overline{R}$, $\overline{G}$, $\overline{B}$ cause the outputs of those video signal processing networks which are being blanked to exhibit a "blacker-than-black" output blanking level to assure that the associated kinescope electron gun is cut-off at such time. The effects of offsets among the $\overline{R}$, $\overline{G}$ and $\overline{B}$ signals are substantially imperceptible during the graphics display intervals, and are significantly less likely to have a visible impact on the color of displayed graphics information compared to offsets among three separate white drive graphic signals.

Figure 5:
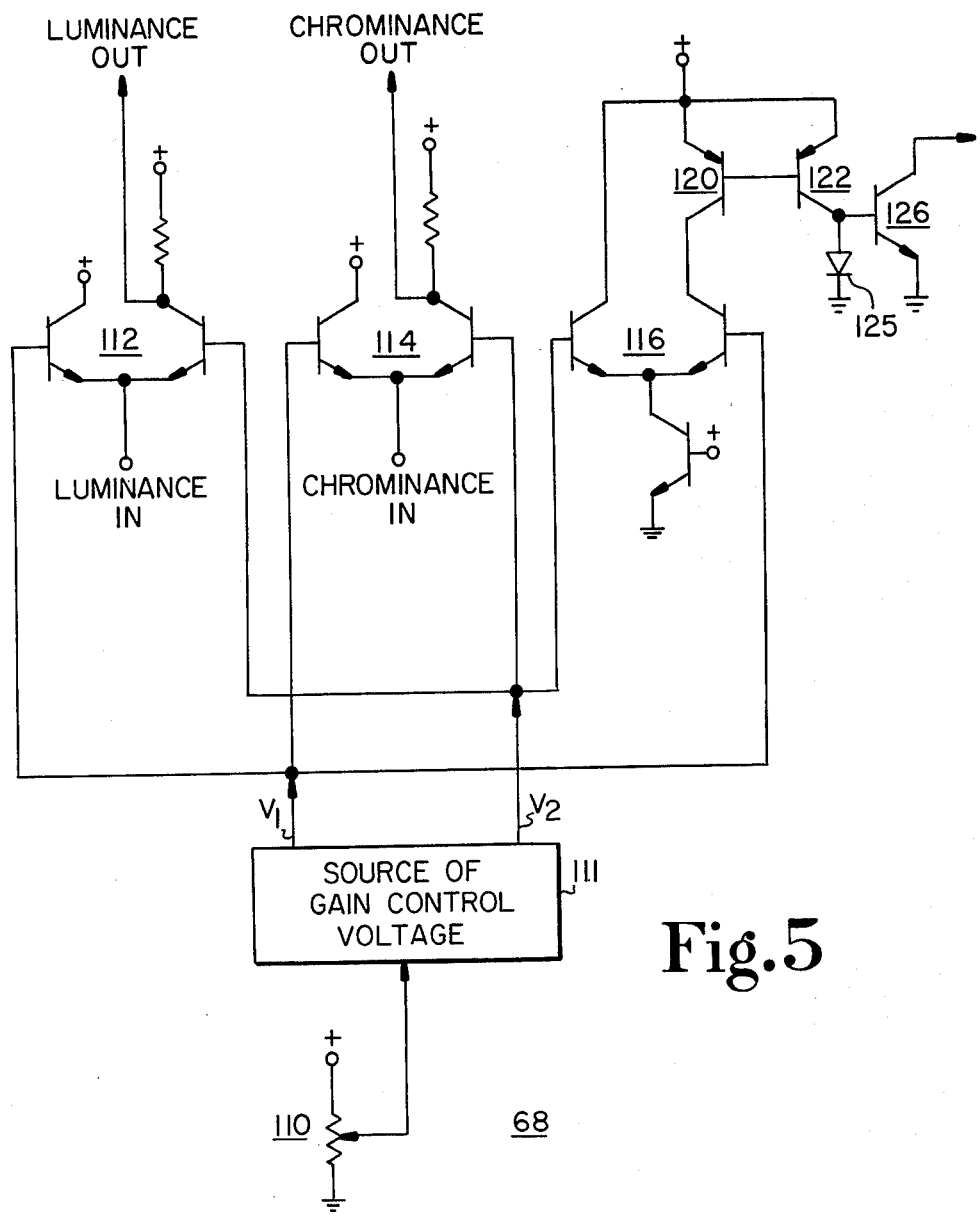
FIG. 5 illustrates circuit details of the video and graphics picture control mechanism.

FIG. 5 shows circuit details of how picture control is accomplished in the system of FIG. 1. Picture control network 68 is shown in FIG. 5 as including a viewer adjustable potentiometer 110 coupled to an input of a gain control voltage source 11, which provides differential gain control output voltages $V_1$ and $V_2$. These control voltages are applied to gain control inputs of differentially arranged luminance and chrominance amplifiers 112 and 114 respectively included in signal processors 16 and 14 shown in FIG. 1, and to control inputs of a differential amplifier 116. The output currents of amplifiers 112, 114 and 116 vary simultaneously in response to control voltages $V_1$ and $V_2$. The output current of amplifier 116 is repeated by means of a first current mirror including transistors 120 and 122, and a second current mirror including diode 125 and transistor 126. An output control voltage derived from the collector of transistor 126 is used to modify the level of the graphics drive signal at the base of transistor 52 as shown in FIG. 1. Gain control voltage source 111 can be of the type disclosed in copending U.S. patent application Ser. No. 296,865 of L. A. Harwood, et al., titled "Circuit for Linearly Gain Controlling a Differential Amplifier", now U.S. Pat. No. 4,426,625.

In a system employing an automatic kinescope beam current limiter, a beam current control voltage derived in a known manner can be applied to the input of gain control voltage source 111 for modifying the peak amplitude levels of the luminance and chrominance signals in a direction to limit excessive kinescope beam currents. Also in this case, the level of the graphics drive signal will be modified simultaneously and in the same sense for limiting beam current.

What is claimed is:

1. In a video signal processing system including a color kinescope for displaying a color image in response to signals applied to plural intensity control electrodes thereof, and plural signal paths for respectively coupling image representative signals to said kinescope control electrodes; apparatus comprising:

means for providing image representative color graphics information signals including a graphics drive signal and plural graphics blanking signals;

means for coupling said graphics drive signal in common to each of said signal paths for enabling said kinescolpe to display graphics information;

means for respectively coupling said plural graphics blanking signals to said plural signal paths for blanking selected outputs of said signal paths to thereby determine the color of displayed graphics information; and control means for varying the level of said common graphics drive signal to thereby control the contrast of displayed graphics information.

2. A color television receiver for processing video signals including chrominance and luminance components, said receiver comprising a color kinescope for displaying a color image in response to signals applied to plural intensity control electrodes thereof; plural signal paths for respectively coupling said chrominance components to said kinescope control electrodes; and apparatus comprising:

means for providing image representative color graphics information signals including a graphics drive signal and plural graphics blanking signals for timing the display of graphics information during intervals within picture intervals of said video signals;

means for coupling said graphics drive signal in common to each of said signal paths for enabling said kinescope to display graphics information;

means for respectively coupling said plural graphics blanking signals to said plural signal paths for blanking selected outputs of said signal paths to thereby determine the color of displayed graphics information; and control means for varying the level of said common graphics drive signal to thereby control the contrast of displayed graphics information.

3. A color television receiver for processing video signals including chrominance and luminance components, said receiver comprising a color kinescope for displaying a color image in response to signals applied to plural intensity control electrodes thereof; plural signal paths for respectively coupling color image representative video signals including said chrominance and luminance components to said kinescope control electrodes; and apparatus comprising:

means for providing image representative color graphics information signals including a graphics drive signal and plural graphics blanking signals for timing the display of graphics information during intervals within picture intervals of said video signals;

means for coupling said graphics drive signal in common to each of said signal paths for enabling said kinescope to display graphics information;

means for respectively coupling said plural graphics blanking signals to said plural signal paths for blanking selected outputs of said signal paths to thereby determine the color of displayed graphics information; and control means for varying the level of said common graphics drive signal to thereby control the contrast to displayed graphics information.

4. Apparatus according to claim 3, wherein said control means additionally varies the level of said luminance component as the level of said graphics drive signal is varied, so that the image contrast of displayed video information and displayed graphics information vary accordingly.

5. Apparatus according to claim 3, wherein said control means additionally varies the level of said luminance and chrominance components as the level of said graphics drive signal is varied, so that the image contrast of displayed video information and displayed graphics information vary accordingly.

* * * * *